(12) United States Patent
Rhoads (10) Patent No.: US 8,401,224 B2
(45) Date of Patent: Mar. 19, 2013

(54) HIDDEN IMAGE SIGNALLING

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 423 days.

(21) Appl. No.: 12/774,512

(22) Filed: May 5, 2010

(65) Prior Publication Data

US 2011/0274310 A1     Nov. 10, 2011

(51) Int. Cl.
*G06K 9/00* (2006.01)
(52) U.S. Cl. ......... 382/100; 382/162; 382/217; 382/276
(58) Field of Classification Search .................. 382/100, 382/162, 165, 217, 276, 280
See application file for complete search history.

(56) References Cited

U.S. PATENT DOCUMENTS

| | | | |
|---|---|---|---|
| 2004/0250078 A1* | 12/2004 | Stach et al. | ................... 713/176 |
| 2006/0013435 A1 | 1/2006 | Rhoads | |
| 2006/0109515 A1 | 5/2006 | Zhao et al. | |
| 2009/0232352 A1 | 9/2009 | Carr et al. | |

OTHER PUBLICATIONS

Tsui et al. "Color Image Watermarking Using Multidimensional Fourier Transforms." IEEE Transactions on Information Forensics and Security, vol. 3, No. 1, Mar. 2008, pp. 16-28.*
Surachat et al. "Pixel-wise based Digital Watermarking Using Weiner Filter in Chrominance Channel." 9th International Symposium on Communications and Information Technology, Sep. 28, 2009, pp. 887-892.*
Liu et al. "Robust and Transparent Watermarking Scheme for Colour Images." Image Processing, IET, vol. 3, No. 4, Aug. 2009, pp. 228-242.*
Seo et al. "Color Images Watermarking of Multi-Level Structure for Multimedia Services." International Conference on Convergence Information Technology, Nov. 21, 2007, pp. 854-860.*
Bors et al. "Image Watermarking Using DCT Domain Constraints." Proceedings, International Conference on Image Processing, vol. 3, Sep. 16, 1996, pp. 231-234.*
Solachidis et al. "Circularly Symmetric Watermark Embedding in 2-D DFT Domain." IEEE Transactions on Image Processing, vol. 10, No. 11, Nov. 2001, pp. 1741-1753.*
Funk. "Image Watermarking in the Fourier Domain Based on Global Features of Concentric Ring Areas." Proceedings of SPIE 4675, Security and Watermarking of Multimedia Contents IV, 596, Apr. 29, 2002, pp. 596-599.*
International Search Report and Written Opinion dated Sep. 9, 2011, in PCT/US11/34829.

* cited by examiner

*Primary Examiner* — Jon Chang
(74) *Attorney, Agent, or Firm* — Digimarc Corporation (57) ABSTRACT

An image is encoded to define one or more spatial regions that can be sensed by a suitably-equipped mobile device (e.g., a smart phone), but are imperceptible to humans. When such a mobile device senses one of these regions, it takes an action in response (e.g., rendering an associated tone, playing linked video, etc.). The regions may overlap in layered fashion. One form of encoding employs modification of the color content of the image at higher spatial frequencies, where human vision is not acute. In a particular embodiment, the encoding comprises altering a transform domain representation of the image by adding signal energy in a first chrominance channel, where the added signal energy falls primarily within a segmented arc region in a transform domain space.

19 Claims, 10 Drawing Sheets

HIDDEN IMAGE SIGNALLING

RELATED APPLICATION DATA

The present technology includes improvements to, and in different embodiments makes use of, assignee's earlier work detailed in U.S. Pat. Nos. 6,122,403, 6,408,082 and 6,590, 996, published applications 20060115110, 20070189533, 20080112596, 20080300011, 20090116683, 20100046842 and 20100048242, and application Ser. Nos. 12/337,029, filed Dec. 17, 2008; 12/482,372, filed Jun. 10, 2009; 12/498, 709, filed Jul. 7, 2009; 12/640,386, filed Dec. 17, 2009; 12/643,386, filed Dec. 21, 2009; 12/712,176, filed Feb. 24, 2010; and 12/716,908, filed Mar. 3, 2010. To provide a comprehensive yet concise disclosure, these documents are incorporated herein by reference, in their entireties.

DETAILED DESCRIPTION

Figure 1:
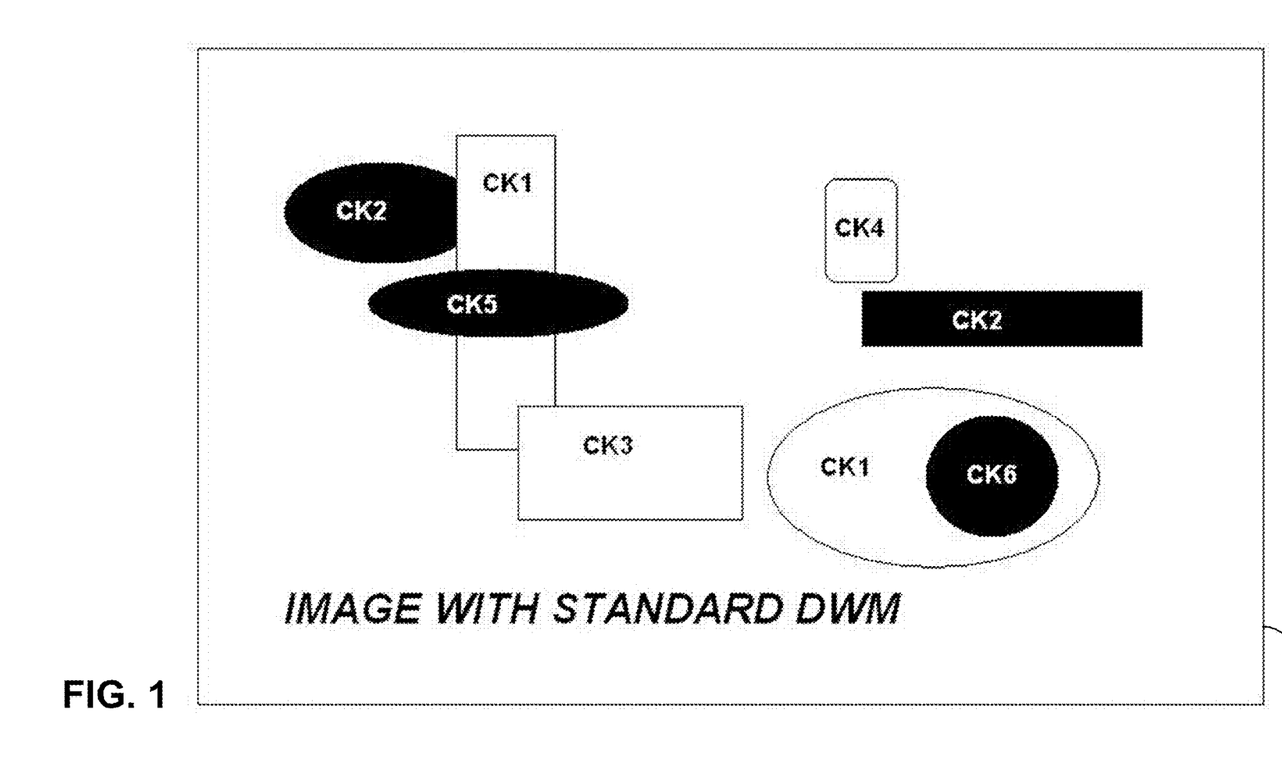
FIG. 1 shows an image including plural hotspot regions encoded with various keys. These may be regarded as YB-Dome spatial chromakeys. Depicted are spatially overlapping "analog" chroma-encoded regions. These are "invisible" to the human eye, but seen by a digital watermark detector.

Referring to FIG. 1, an image 10 is encoded to define one or more regions (CK1, CK2, etc.) that can be sensed by a suitably-equipped mobile device (e.g., a smart phone), but are imperceptible to humans. When such a mobile device senses one of these regions, it takes an action in response.

The content of image 10 can be arbitrary. Details (except the hidden regions) are not shown for clarity of illustration.

The regions can be of any shape; only a few are illustrated. As indicated, they may overlap in layered fashion. Each region has a key associated with it (e.g., CK1, CK2, etc.). Because the preferred embodiment employs a chrominance-based embedding arrangement, these keys may be termed chroma keys. However, other embedding arrangements can alternatively be used.

Figure 1A:
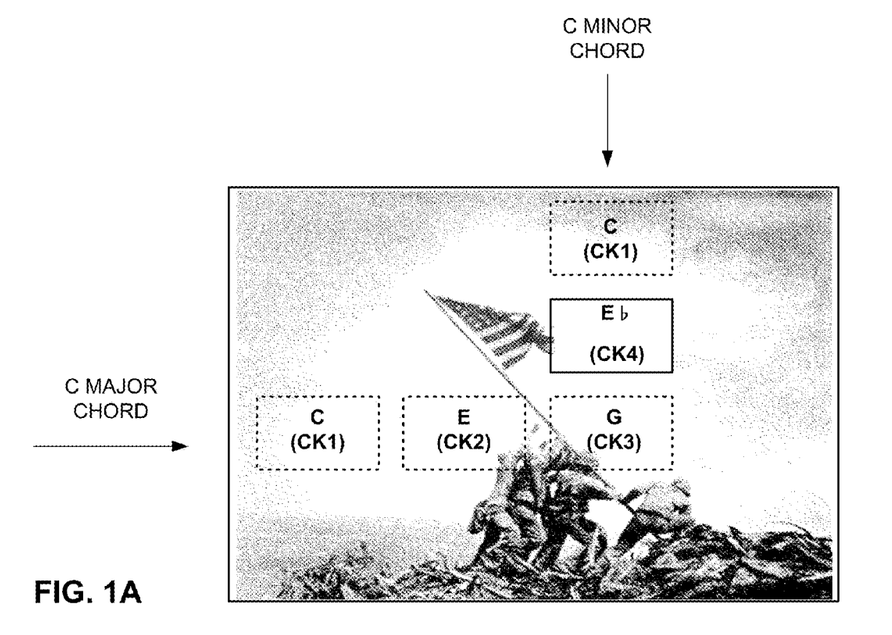
FIG. 1A shows another image similar to FIG. 1, with which a smart phone can interact to yield different musical sounds.

FIG. 1A shows an exemplary illustration, employing five regions, hidden in the iconic Iwo Jima photograph but shown as visible for explanatory purposes. When the left-most region is sensed by a smart phone, it renders a musical note at the pitch "C." The adjacent region causes the phone to render a pitch at "E." Similarly with the next one, at "G."

The top-most region similarly causes the phone to render a musical note at the pitch "C." Beneath it, however, is a region that causes the phone to render the musical note $E^{\flat}$. Below is the "G" region noted above.

If a user sweeps a suitably-programmed smart phone horizontally across the image from left to right, so that the phone's camera "sees" the horizontal row of regions in sequence, a C-major chord progression is sounded. Conversely, if the user sweeps the phone vertically, downwardly, across the indicated regions in the image, a C-minor chord progression is sounded.

More particularly, in this example the regions are encoded with four different keys. The same key (CK1) is used for both the left-most and top-most regions, since they both correspond to the same musical tone. Different keys CK2, CK3 and CK4, are used for the other three regions.

In the illustrated example, the image also is digitally watermarked (DWM) in known fashion to steganographically convey a plural-bit payload of auxiliary data (e.g., 32- or 128-bits)—although this is not always required. These plural bits can identify a data structure that is consulted by the smart phone in determining what response should be associated with which key.

Identification of the data structure by the plural bit auxiliary data can be by various means. One is a pointer (e.g., an address) to a local or remote table, or database record. In this instance, the data structure indicates that if CK1 is detected, the phone should render a musical tone of "C" (i.e., 262 Hz). A complete table may instruct the phone to respond to different keys as follows:

TABLE I

| | |
|---|---|
| CK1 | Render 262 Hz tone |
| CK2 | Render 330 Hz tone |
| CK3 | Render 392 Hz tone |
| CK4 | Render 311 Hz tone |

This table is exemplary only, and the illustrative responses are more basic than may often occur—simply for expository convenience.

A tone may sound for a fixed duration, e.g., 1 second, commencing with initial detection of the corresponding key region, or it may persist for as long as the region is within the field of view of the smart phone camera. In the latter case, chords of plural notes can be rendered by positioning the camera so that it can view some—or all—of the depicted regions. The chord is augmented with more notes as the camera is moved away from the image, and resolves to fewer notes as the camera is moved closer.

The use of auxiliary data to indicate what responses should be associated with different keys allows simple dynamic reprogramming of the user experience, even with a "fixed" image. For example, by simply changing data in the table to which the illustrative auxiliary data (watermark) points, the image can trigger a wholly different set of responses—all without modification of the imagery.

Figure 2:
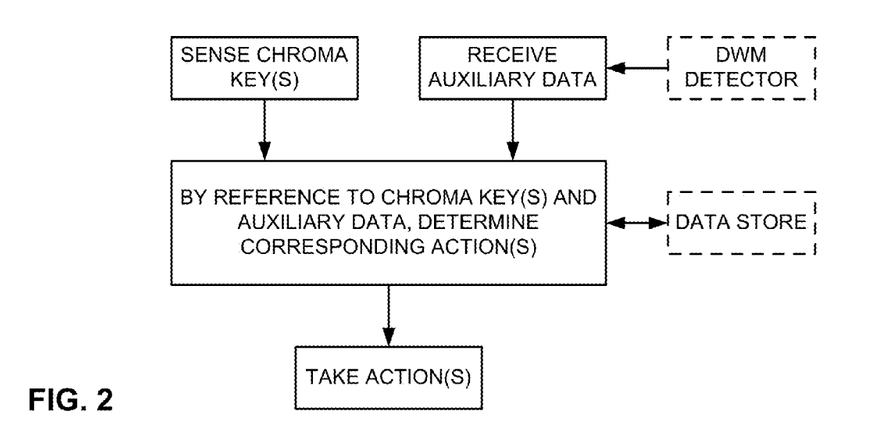
FIG. 2 is a flow chart of a method that can be used in conjunction with the image of FIG. 1A.

A flow chart detailing the just-described method is shown in FIG. 2.

Figure 3:
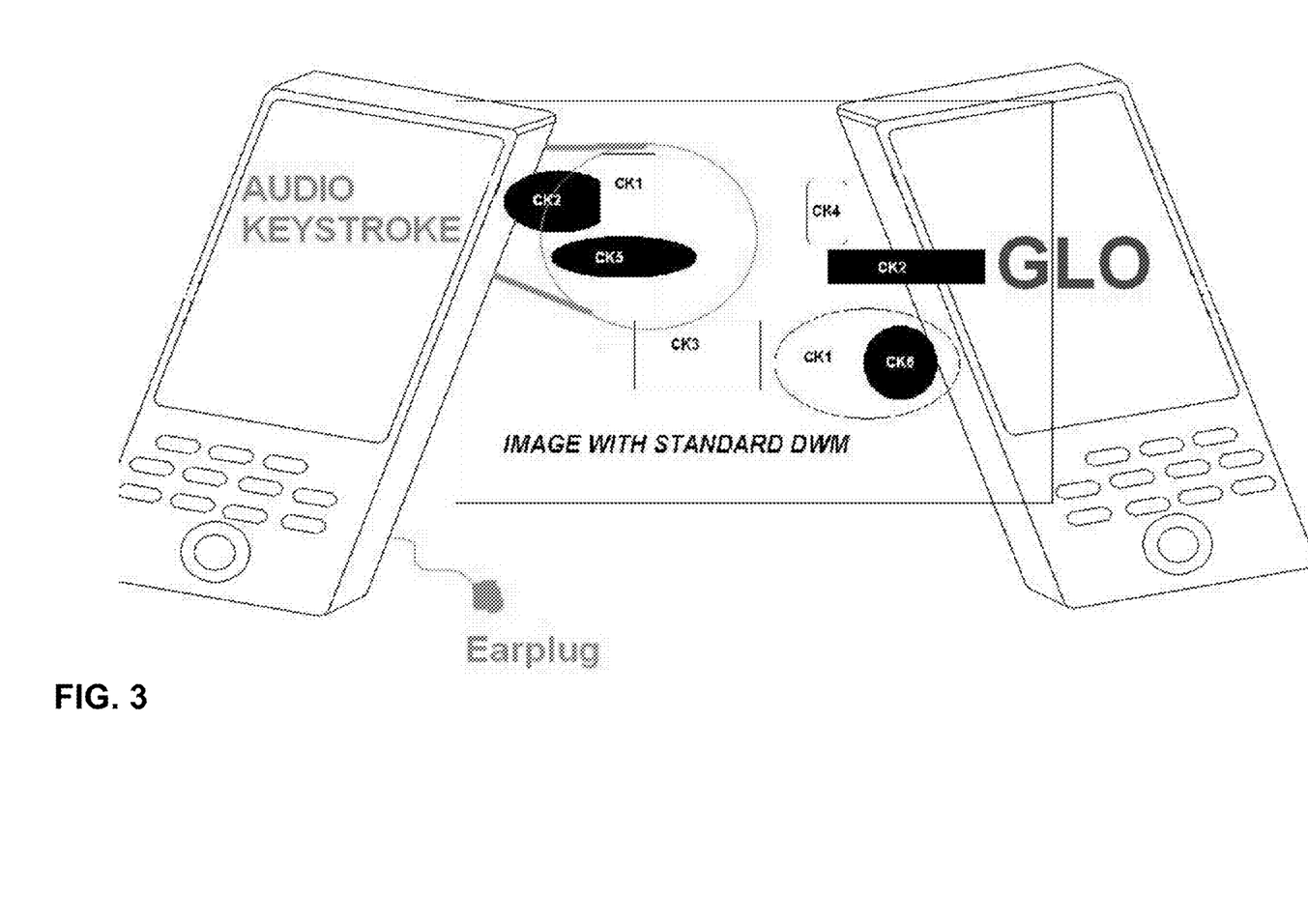
FIG. 3 is an illustration showing some of the different behaviors that can be triggered in a smart phone by detection of one or more hotspot regions in the image of FIG. 1. Depicted are both an audio-mode, and a HotMap (GLO) mode.
Figure 4:
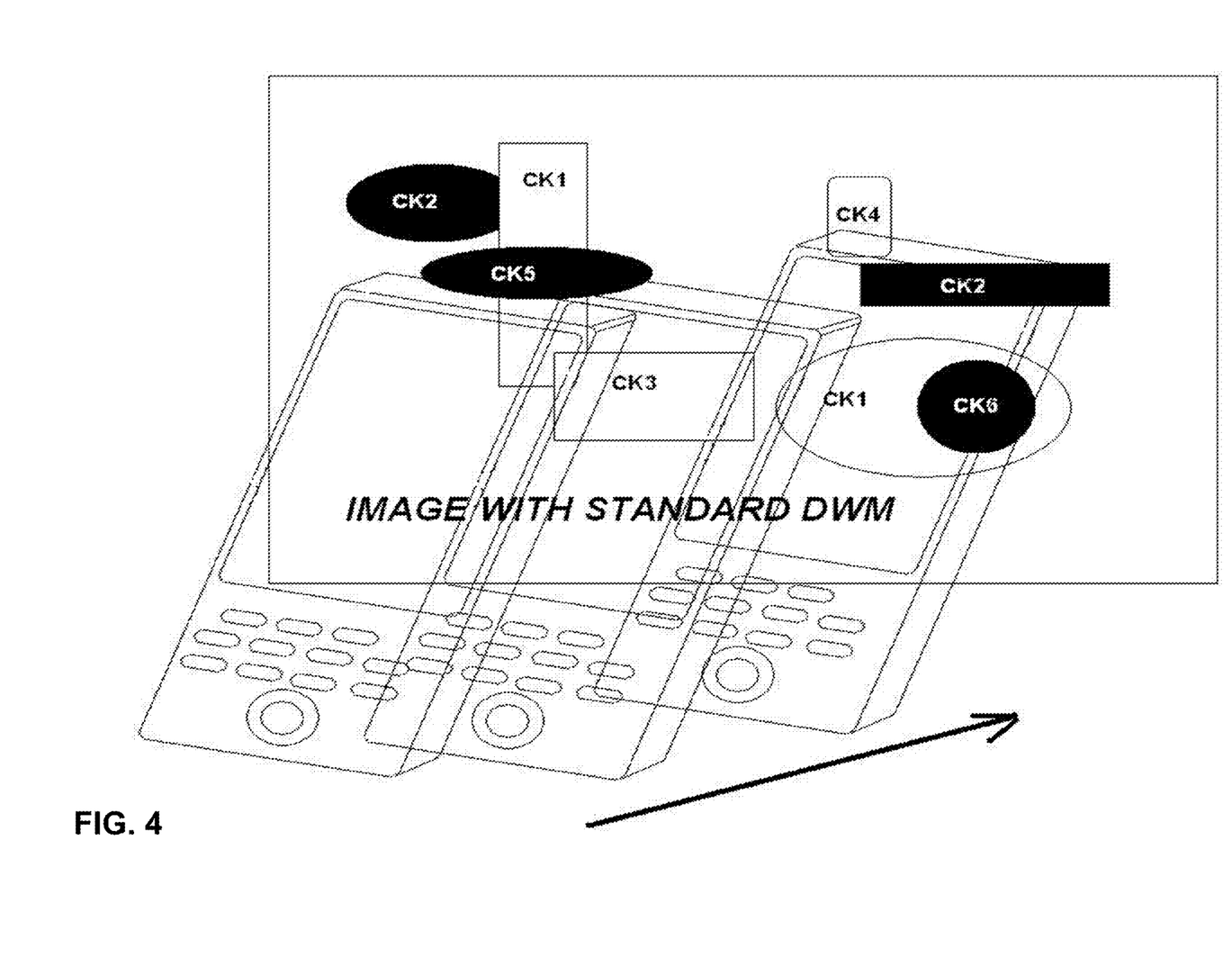
FIG. 4 shows that user interaction with imagery encoded in accordance with the present technology can employ motion.

FIGS. 3 and 4 further illustrate the just-discussed feature, by which a smart phone camera detects different hidden regions in an image, and can yield different outputs as the phone is moved.

"GLO" in FIG. 3 is an acronym for Graphic Latent Overlay. This technology is detailed in documents including published patent specifications 20080300011 and 20090116683, and refers to arrangements in which detection of a first feature (commonly a steganographically encoded feature) in mobile phone-captured imagery triggers display of a second graphical feature on the phone screen—overlaid on the image in which the first feature was detected. In some instances, the overlaid feature is presented on the screen at a position that is dependent on the position of the first feature in the phone's field of view. The overlaid feature may also be warped to correspond with apparent warping of the first feature.

Related technologies are detailed in application Ser. Nos. 12/640,386 and 12/712,176, where such overlaid features are termed "baubles" (and may be based on visible and/or steganographic features of captured imagery).

Thus, instead of playing a musical tone when a key region is sensed, the phone can respond by overlaying a graphical display on the captured imagery.

Of course, playing musical tones and overlaying graphical displays are a few of countless behaviors that detection of a key region can trigger. Any imaginable action or script can be similarly triggered when one or more of the hidden regions (which may be regarded as "hotspots") is sensed.

Consider, as a particular example, a photo of members of a hockey team. The oval region of each player's face is marked with a different hidden key, CK1-CK20. When a user directs the smart phone camera to a particular player's face, the corresponding key is detected. A watermark is also detected from the image (and may span the entire image). The watermark payload points to a table, like Table I above, having an entry for each of keys CK1-CK20. This table, in turn, may store links to Flash video presentations, resident at an NHL web server or in the cloud, that show season highlights for that respective player. When the user moves the smart phone camera to view different faces in the team picture, different video plays from the past season are rendered on the user's phone.

(The watermark payload can serve other purposes as well. For example, the payload can include one or more flag bits instructing the smart phone not to provide a response if plural keys are detected within the captured imagery. Alternatively, they may instruct the smart phone to prompt the user to more closely direct the camera to one particular feature (face) in the image. All prior art uses of watermark signaling can also be employed in conjunction with the present arrangements.)

While images are commonly perceived in the spatial (or pixel) domain, a number of other representations are also useful, as is familiar to those skilled in the art. Generally, these other representations are termed "transform domains." One common transform domain is Fourier space (commonly called the spatial frequency domain, when used with images). By applying a Fourier transform to an image (either as a whole, or more commonly as divided into square regions, e.g., 8×8 pixels or 32×32 pixels), a representation of the image in Fourier space can be obtained. Such representation is commonly presented on a complex half-plane coordinate system, as shown in FIG. 5.

Figure 5:
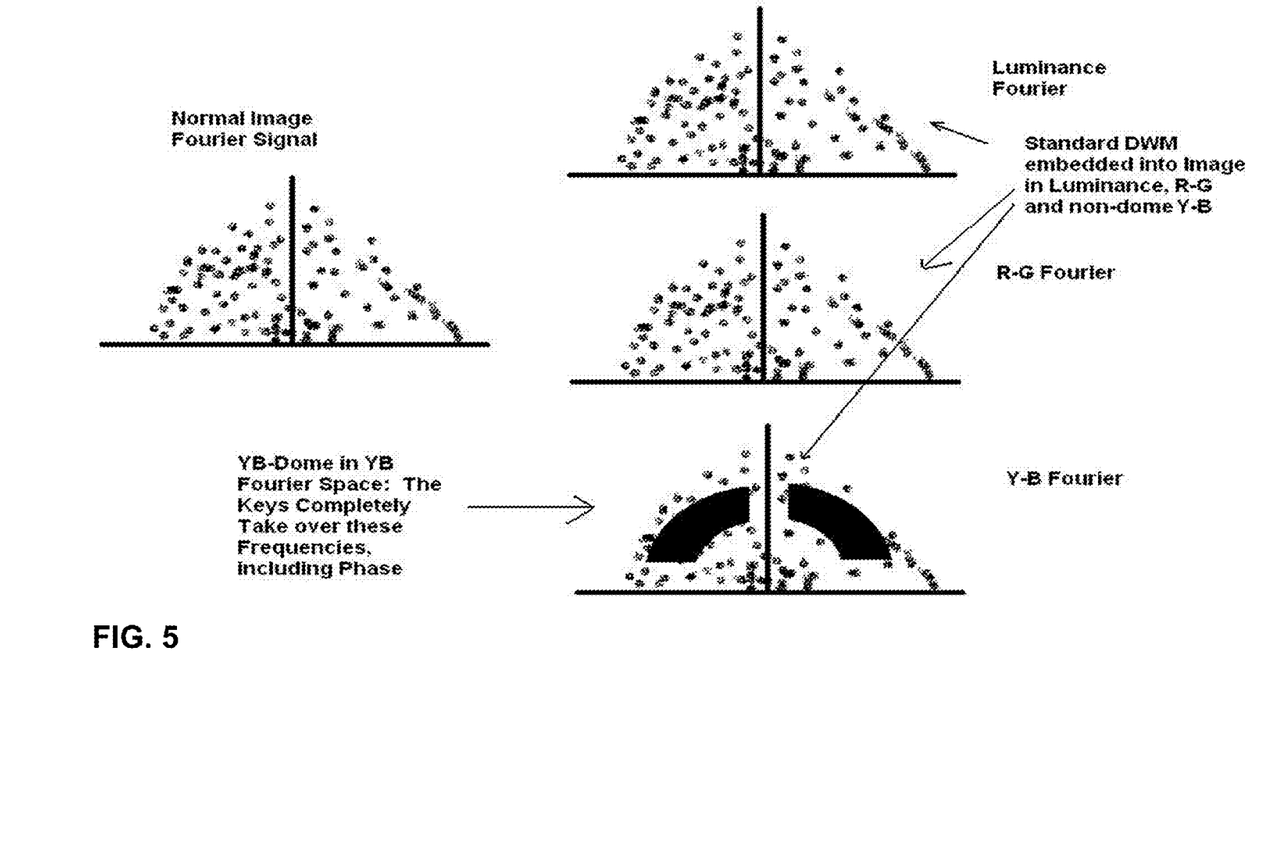
FIG. 5 illustrates decomposition of an image into luminance and dual chrominance channels in the spatial frequency domain, and embedding of a key in the Y-B channel. Particularly detailed is allocation of the YB-Dome signal space, including how such signal can take over certain frequency bands—with no need to share with existing artwork.

The left part of FIG. 5 shows a representative spatial frequency domain representation of a sample image (e.g., the Iwo Jima image earlier presented). This image is encoded with a prior art digital watermark that conveys auxiliary data. (A suitable watermark is detailed in U.S. Pat. No. 6,590,996.) The watermark signal energy is interspersed among the rest of the image energy, and is not separately identifiable in FIG. 5.

The image may be divided into component image planes, such as luminance, and dual chrominance channels: R-G (red-green) and Y-B (yellow-blue)—each of which has its own Fourier space representation. These three channels, in Fourier-space, are shown at the right side of FIG. 5.

In the illustrated embodiment, the encoding of the keys into regions of the image is achieved by adding energy in one of the chrominance channels (e.g., Y-B). This can be done without objectionable visible effect because the human visual system is less sensitive to color than it is to luminance.

Figure 6:
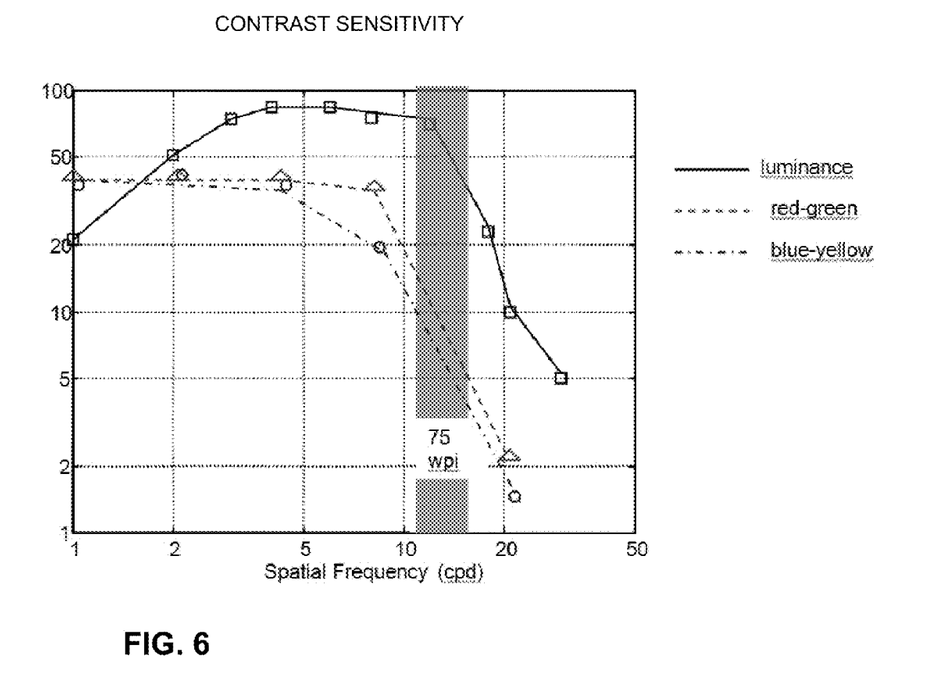
FIG. 6 is a chart showing the sensitivity of the human visual system to the three channels of FIG. 5, as a function of image spatial frequency.

This is shown in FIG. 6, which plots HVS sensitivity for luminance, red-green chrominance, and yellow-blue chrominance, as a function of spatial frequency, in cycles per degree. (This chart is based on data collected at a viewing distance of 12 inches.) As can be seen, HVS sensitivity drops off sharply at chrominance spatial frequencies above 10 cycles per degree (cpd), and is down dramatically at 20 cycles per degree. Sensitivity above 25 or 30 cycles per degree is essentially nil.

In contrast, image sensors used in cameras can commonly distinguish chrominance features at such spatial frequencies.

Thus, to encode a key in an image region, such as CK1 in FIG. 1 or 1A, energy can be added to the yellow-blue chrominance channel, desirably at frequencies of above 10, 20, 25 or 30 cpd—where the effect is generally not noticeable to human observers, but can readily detected from optical sensor data.

In the preferred embodiment the added energy needn't be exclusively above the indicated frequency. But desirably most of the added energy is in that range (e.g., more than 50%, 75%, 95%, or 98%).

In this embodiment, and in others, the magnitude of the added energy can also be scaled to achieve a desired level of visibility (or invisibility). In other embodiments, signal energy at frequencies primarily below 10 cpd can be employed, if the magnitude of the added energy is low enough to be visually un-objectionable.

One example of suitable encoding, in Fourier space, is shown in the lower right of FIG. 5 by the black bands. This added signal energy dominates existing image energy in these spectral frequencies (including phase), but the effect typically is essentially imperceptible to human viewers. The effect is to slice out a region in chrominance space and allocate it to representing a hidden a key. Thus encoded, a suitably-equipped smart phone detector can quickly discover the presence of the hidden region in the image, and determine its extent, and respond to such discovery.

In many instances it is desirable to be able to distinguish different keys, such as CK1, CK2, etc., in FIG. 1. This can be done by representing different keys with different Fourier domain zones of signal energy in the chosen (e.g., Y-B) chrominance channel (including phase). Such arrangement is shown in the upper right of FIG. 7.

Figure 7:
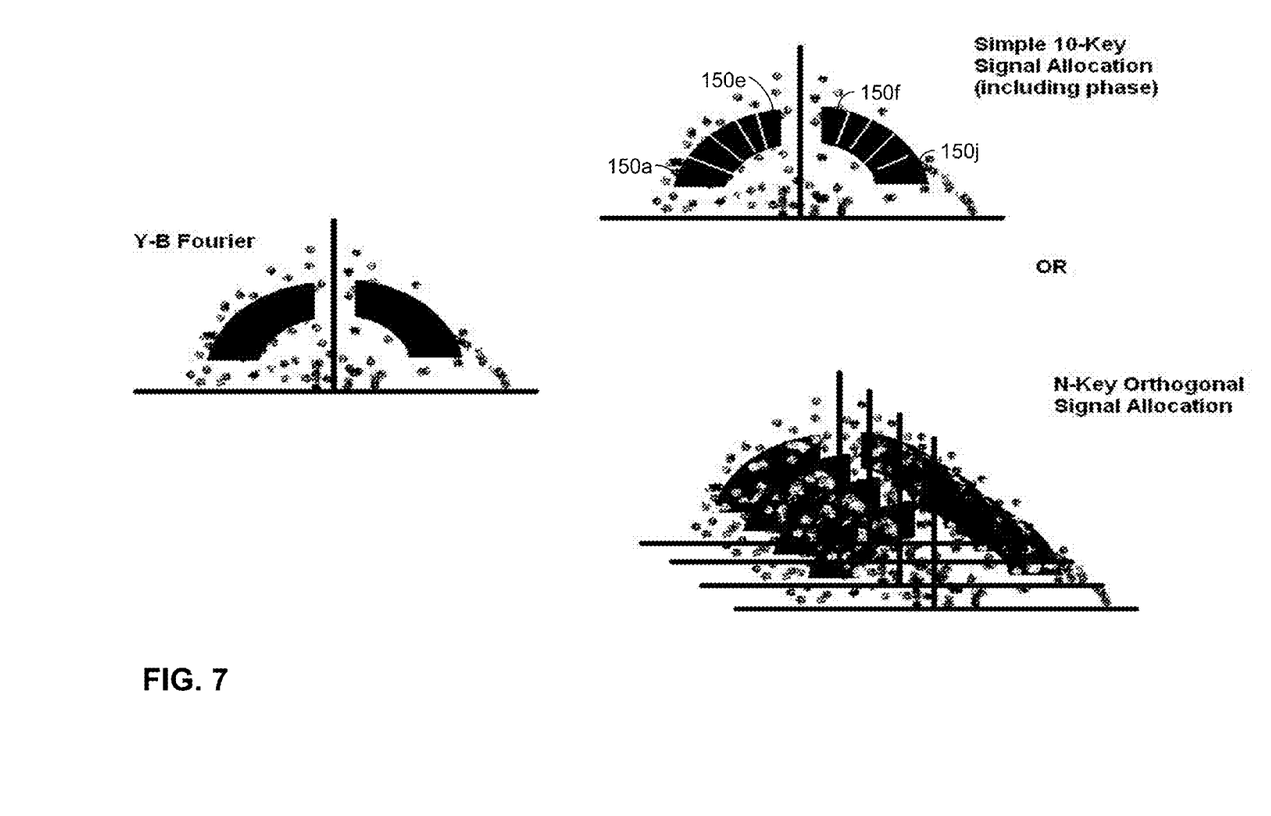
FIG. 7 illustrates that plural different keys can be encoded within a single chrominance channel.

In particular, this spatial frequency domain plot shows 10 keys, 150$a$ through 150$j$. In FIG. 1, region CK1 can be encoded by adding signal energy corresponding to the keystone-shaped Fourier zone 150$a$ to that image region. Likewise, image regions CK2-CK5 can be encoded by adding energy at spatial frequencies indicated by keystone zones 150*b*-150*e*. Five additional keys can be represented by adding energy corresponding to the spatial frequency zones labeled 150*f*-150*j*. (It will be recognized that the discussed plot encompasses ten different keys. A particular region of the imagery would not necessarily have this depicted signal composition in Fourier space. More likely, only one or a few of the keystone features would be present.)

Again, the illustrations do not show phase, which is a helpful dimension of these hidden signals. The phase component contributes certainty to detection of these keys (i.e., increasing signal-to-noise ratio).

In one particular embodiment, different keys may be of opposite phase polarity (analogous to +1/−1). One key, CK-a, may be represented by the keystone zone 150*a* with a certain phase profile across the zone, and another key, CK-b, may be represented by energy in the same keystone zone 150*a*, but with a phase profile that is 180 degrees out of phase relative to key CK-a. This results in a doubling of the keyspace (e.g., the ten zones 150*a*-150*j* can represent 20 distinguishable keys).

A further multiple-key arrangement is shown in the lower right of FIG. 7. Here N mutually-orthogonal signals in Fourier space are employed. For purposes of illustration, a simple example is for one signal to be a sine wave at an image frequency f. Another may comprise a cosine signal at the same frequency. A third may comprise a sine signal at a frequency 2f. Etc. (The design of orthogonal signals in Fourier space is within the capability of the artisan, although such signals are difficult to represent in simple drawings. In one view, two keys are orthogonal if the product of their phase profiles yields zero.)

Typically, all keys in an image are encoded at the same magnitude, usually at a level that renders the keys imperceptible to humans in the rendered imagery. Having a uniform magnitude across all keys can be useful in detection, since detection of one key provides magnitude information that can be used to help discriminate the presence of other keys.

In some embodiments, certain keys may have different magnitudes (e.g., they may be partially "on"). This can be used to further expand the encoding space. E.g., key CK-c can have a magnitude that is half that of key CK-d, but the keys are otherwise the same in spectral frequency content and phase profile. Instead of binary values of single keys (e.g., +phase and −phase), quaternary and other multi-valued symbols can be used.

If the relations between different magnitudes are known by the detector (e.g., some keys are 100% "on"; other keys are 50% "on," and still others are 25% "on,"), this knowledge can again be used as a basis in discriminating keys. (These may be regarded as "analog keys.")

In a system employing multiple keys, each can trigger a different action (e.g., different tones in the FIG. 1A example). Still further actions can be triggered when multiple keys are overlaid in an image region (e.g., where CK5 overlaps CK1 in FIG. 1). Thus, in a 10 key system, there may be ten responses corresponding to the ten individual keys. Nine further responses can correspond to regions where key 1 is overlaid with one of keys 2-10. Eight further responses can correspond to where key 2 is overlaid with keys 3-10. Seven further responses can correspond to where key 3 coexists with keys 4-10. Etc. Thus, in a system that contemplates only layers of up to two keys, 55 different states can be defined. (A geometric increase of possible states naturally occurs if three- or more keys are overlaid.)

If the keys have different magnitudes, the responses triggered by the keys can vary accordingly. In the tonal example of FIG. 1A, for example, if key CK3 is half the magnitude of the other keys, then its corresponding tone may be rendered at half the volume of those triggered by the other keys.

The smart phone detector can apply Fourier-domain templates for the different keys it expects to encounter—looking for the existence of the hidden signals. This can comprise a correlation detector that performs multiplications with each of the respective key templates—judging whether resultant output signals exceed a threshold value.

The template(s) can encompass more of Fourier space than the precise boundaries of the sought-for key(s), allowing detection of keys in the case of distortion of the imagery (with consequent distortion of the keys in Fourier space).

Figure 8:
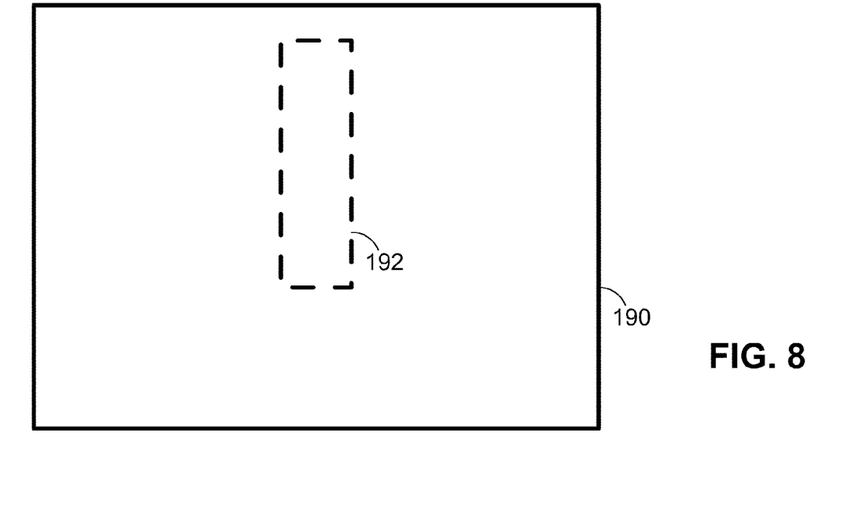
FIG. 8 shows that a sub-region of smart phone's field of view can be used to detect keys in imagery.

Typically, smart phone cameras have a rectangular field of view (e.g., 2048×1536 pixels). In some instances it is desirable for the smart phone camera to be responsive to keys only in a sub-region of this field of view. Such an arrangement is shown in FIG. 8, in which the full camera field of view is the image frame 190, yet responses are only triggered by keys found within the sub-region 192. The shape of the sub-region can be arbitrary; the illustrated rectangle (of about 250 pixels in width by about 900 in height) is only exemplary.

In another arrangement, the sub-region 192 is circular or oval. Moreover, the software that controls use of sampled image data from region 192 can apply a foveal filter: using all the pixels at the center of the region for most acute detection, but using a sparser sampling of pixels near a periphery of the region 192, so that sensitivity or acuity tapers off.

A camera-equipped detector using the present technology can discern the spatial extent of key regions, e.g., identifying region boundaries to an accuracy of tens of imaged pixels or less (e.g., 5 to 10 "waxels"—watermark signal elements). The detector can thus "image" the hidden keys, e.g., generating a virtual map of their locations within the imagery.

If the geometrical shapes of the keys are known in advance (e.g., if keys are circular, or square, or equilateral triangles), then their shapes in the captured imagery can be used to characterize any off-axis viewing of the image. This information, in turn, can be used to aid detection of any watermark signal encoded in the imagery.

For example, the device processor can re-sample the image data in correspondence with distortion of the known key shapes. If the key is known to include two parallel edges of the same length, yet a first edge appears in the captured imagery to be 50% shorter than a second edge, then image points along the first edge can be resampled by the processor at a spatial frequency twice those alone the second edge—with interpolated sampling rates being used along intermediate parallel lines. The watermark decoding process can then be applied to the resampled image—from which this aspect of a perspective warp has been effectively removed.

A more sophisticated approach to dealing with perspective does not require knowledge of geometrical key shapes. Rather, it relies on knowledge of a key's Fourier domain representation.

Figure 9A:
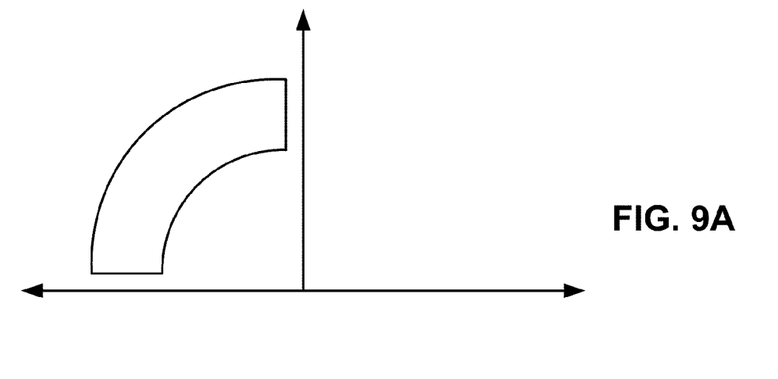
FIGS. 9A and 9B show how a key may be warped by perspective or other distortion of the image, allowing such distortion to be determined.

To illustrate, an original image may include a key having a Fourier domain shape shown in FIG. 9A. If the image is captured from an off-axis perspective, the key shape may bulge, e.g., resulting in the Fourier domain representation shown in FIG. 9B. The transformation, from FIG. 9A to 9B, reveals the apparent transformation of the image as viewed by the camera (e.g., affine and perspective warping).

A programmed processor (e.g., in a smart phone) can perform a brute-force search for an arc-like feature in Fourier space, and then sleuth corresponding warp parameters of the image from the shape of the discovered arc. Another approach employs Fourier-Mellin-based processing to locate the distorted arc zone within Fourier domain image data, using technology akin to that that detailed in U.S. Pat. Nos. 6,408,082 and 6,590,996.

The detailed keys are typically conspicuous in Fourier space, allowing ready determination of warp parameters by such methods—at least in a gross sense. Once a rough sense of the image viewing perspective is thereby discerned (e.g., to within 5 or 10 degrees), the image data can be resampled accordingly, e.g., as if captured from an on-axis camera perspective. Then calibration signals commonly found in digital watermark signals (e.g., per the just-cited patents) can be used to resolve remaining small distortions in the resampled imagery, allowing accurate reading of large payload watermark data.

Figures 10A, 12:
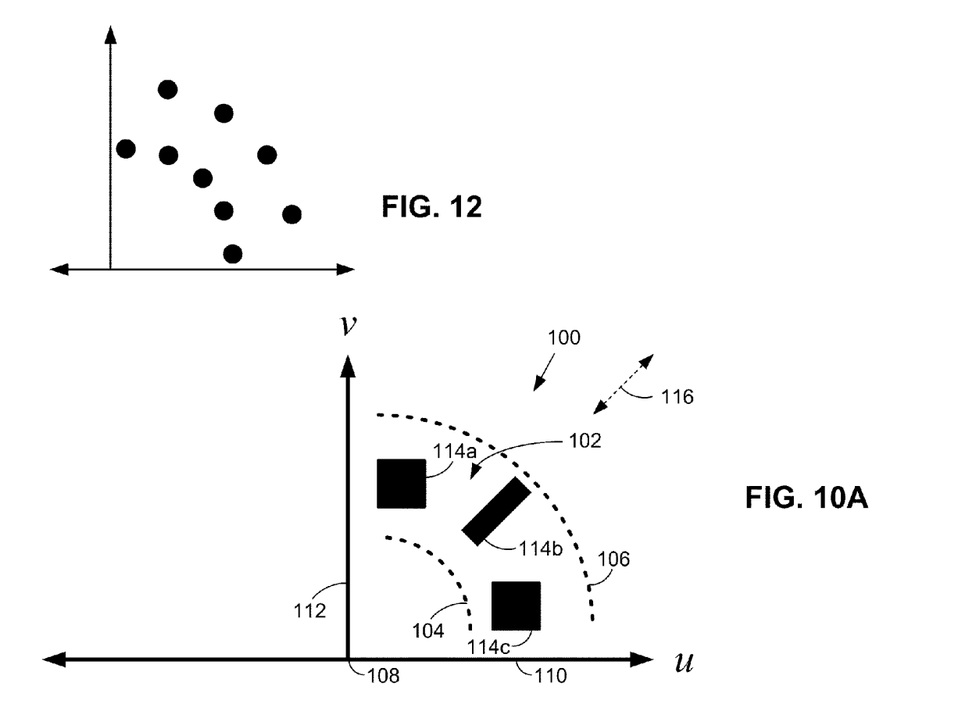
FIGS. 10A and 10B show different spectral signal energies within a segmented arc in Fourier space that can be employed to represent keys.
FIG. 12 shows another key representation in Fourier space.

The artisan will recognize that calibration signals in the cited watermark technology serve as a search-space accelerator. The key technology detailed herein can be viewed as a supplemental calibration signal, and detectors may be tuned to search off-axis camera angles. Keys for this purpose can take the form of paired staggered strings of pearl-like-features in the Fourier Y-B magnitude space (i.e., two concentric rings of peaks in the Fourier domain, such as shown in FIG. 12). The detector can then apply a family of templates—corresponding to these key features (or other known key features) as they would appear in the Fourier domain if the image is viewed in stepped angles off-axis (e.g., in 5 degree steps, from 0 to 45 degrees) and employing Fourier-Mellin analysis.

This operation is suitable for quick performance by a cloud-based processor, e.g., in 250 ms or less. The smart phone can send a 32×32 pixel region from the center of the camera view to the cloud processor (either in the pixel domain, or after transforming to Fourier space—possibly with compression that does not corrupt the watermark signal). The cloud processor, in turn, applies the cited templates to the received data to locate the key signal, and returns an estimate of the viewing angle to the phone. The phone then resamples the image in accordance with this estimated viewing angle, and applies the cited watermark decoding process to extract the watermark payload.

(Other divisions of labor between the phone and cloud are likewise possible, e.g., with the cloud doing all of the processing including extracting the watermark payload.)

In some embodiments, the keys can be designed to have "fragile" properties, so as to aid in image/document authentication. For example, the hidden keys can be composed of spectral frequencies that are at or near the high frequency limit for imaging sensors to detect. The magnitudes of these signals can also be tailored so that the keys are barely detectable in the original image. If such an original image is scanned and re-printed, this low amplitude and/or high frequency data will likely degrade so that it is no longer detectable. CCD, CMOS and other image sensors can be designed with such technology in mind, to achieve desired properties in the combined system.

One application of this technology is as a keypad, e.g., akin to the sorts conventionally used to open a safe, set alarms, etc. For example, a smart phone can capture a frame of imagery from print media or another screen and, by reference to a watermark decoded from the imagery or other auxiliary data, overlay a graphic showing a touchpad. The user can touch the different buttons displayed on the screen. The touch-sensitive screen provides output coordinate data by which pixel regions in the captured imagery corresponding to these touches can be determined. Hidden keys detected at these regions in the captured imagery are noted, and the sequence of such keys defines the "combination" or other code entered by the user (e.g., CK4, CK2, CK5, CK9). If the entered code matches a stored sequence, an action can be taken. Or other action can be taken in accordance with the keystrokes (e.g., reprogramming a thermostat, such as detailed in application Ser. No. 12/498,709).

In a variant embodiment, the outlines of the hidden keys are discerned from the captured image, and made visible as graphic overlays. Again, these can be touched in a desired sequence. By reference to the keys, in conjunction with the watermark, responsive action can be taken.

In a further variant, the graphic overlay can change as further keys are touched.

CONCLUDING COMMENTS

While this specification earlier noted its relation to the assignee's previous patent filings, it bears repeating. These disclosure materials should be read in concert and construed as a whole, together. Applicant intends, and hereby expressly teaches, that features in each disclosure be combined with features in the others. Thus, for example, the arrangements and details described in this specification can be used in variant implementations of the systems and methods described in application Ser. Nos. 12/640,386, 12/712,176, and 12/716,908, while the arrangements and details of those patent applications can be used in implementations of the systems and methods described in the present specification. Similarly for the other noted documents. Accordingly, it should be understood that the methods, elements and concepts disclosed in the present application be combined with the methods, elements and concepts detailed in those cited documents. While some have been particularly detailed in the present specification, many have not—due to the large number of permutations and combinations, and the need for conciseness. However, implementation of all such combinations is straightforward to the artisan from these teachings.

Having described and illustrated the principles of the technology with reference to selected examples, it should be appreciated that the technology is not so limited.

For example, while described in the context of static imagery, the technology is likewise relevant for use with video, e.g., comprising many successive frames, or fields.

Static images can take any known form, e.g., printed, or presented on an electronic display screen.

Although the detailed arrangement employs digital watermarking to convey auxiliary information by which actions corresponding to sensed key regions can be determined, this is not necessary. Other communications means can be utilized, e.g., RFID chips, barcodes, header data, etc. Alternatively, a fingerprint of the imagery can be calculated, and matched with reference information in a database to identify the image, which identification can also serve to identify metadata by which associations between the keys and appropriate responses can be determined. (Examples of image/video fingerprinting are detailed in patent publications 7,020,304 (Digimarc), 7,486,827 (Seiko-Epson), 20070253594 (Vobile), 20080317278 (Thomson), and 20020044659 (NEC).)

In still other arrangements, the auxiliary data is not necessary. Instead, the different keys can be ascribed meaning by a known reference, such as a data table stored in the smart phone or elsewhere—not pointed-to or otherwise indicated by auxiliary data. When a key is detected, the reference is consulted to determine what behavior should be performed.

While the detailed arrangement employed a Fourier transform (e.g., an FFT), any number of other image transforms may alternatively be employed. Examples include DCT, wavelet, Haar, Hough, etc.

It should be recognized that tonal signatures, such as the chord progression illustrated in FIG. 1A, can be used as a quick check of the authenticity, or other attribute, of an image.

Although reference was made to the keys being hidden or invisible, this is all a matter of degree, which can be tuned to meet the needs of particular applications. In some applications, for example, some visibility is acceptable.

As used herein, "primarily" means more than half (50%). "Predominantly" means more than 75%. "Essentially" means more than 95%. "Almost exclusively" means more than 98%, and "exclusively" means 100%.

A segmented arc region refers to areas like that shown in solid black FIGS. 5 and 6. These zones do not encompass the origin of the complex plane—so if mirrored about the axes, there would be a gap at the center. Put another way, a segmented arc region typically is defined, in part, by an arc segment that serves as part of a bounding perimeter, a non-zero distance away from the origin—corresponding to a minimum image frequency. Practically speaking, the segmented arc region is likewise bounded by an outer perimeter that is a finite radius from the origin—indicating the maximum image frequency. Likewise, a segmented arc region does not encompass any part of the horizontal (u) or vertical (v) axes. In a particular implementation there may be one segmented arc region, or there may be several. (In many instances such regions may be mirrored around an axis, such as the v axis.

The added/subtracted signal energy is typically placed within a segmented arc region. However, it need not fully occupy the region. An example is shown in the transform domain plane 100 of FIG. 9A. The arc region 102 is defined by an inner perimeter 104 and an outer perimeter 106. This region 102 does not include the origin 108. Nor does it include the horizontal or vertical axes 110, 112. Within this segmented arc region 102 are one or more spatial frequency zones 114 that are increased in spectral energy. Each such zone typically comprises more than a single frequency (e.g., an impulse function), although a single frequency can be used in variant embodiments. Each zone commonly has extent in at least one, and usually two, directions in the transform plane.

Figure 9B:
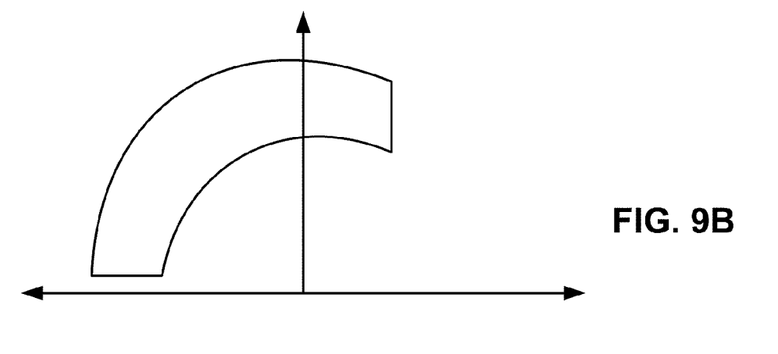

Although the transform domain signal energy zones shown in FIG. 9A have certain symmetry (e.g., around axis 116), this is not required. FIG. 9B, for example, shows another arrangement. Non-symmetrical arrangements are desirable in various instances.

Figure 10B:
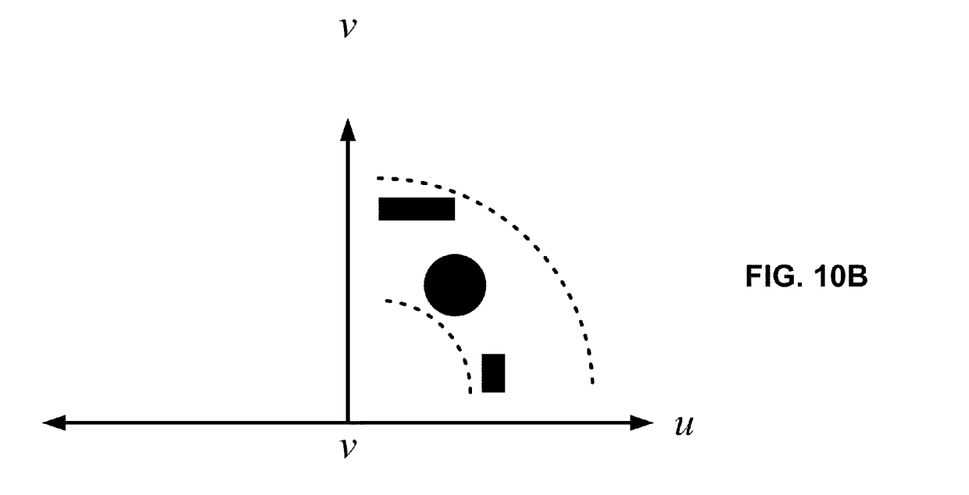
Figure 11A:
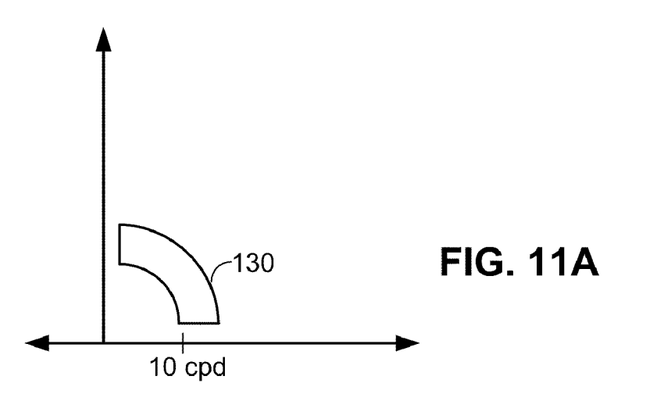
FIGS. 11A-11C illustrate that keys can have harmonic relationships, and can be used in connection with binary encoding.
Figure 11B:
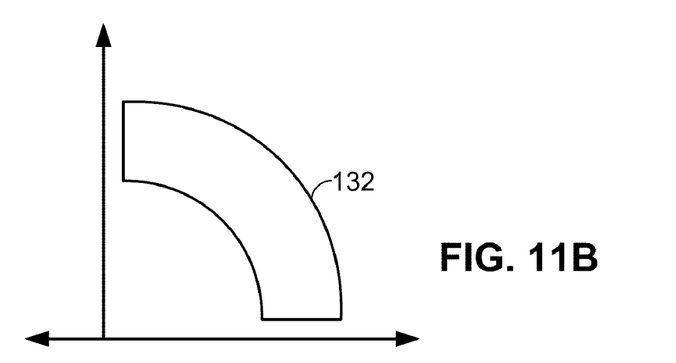
Figure 11C:
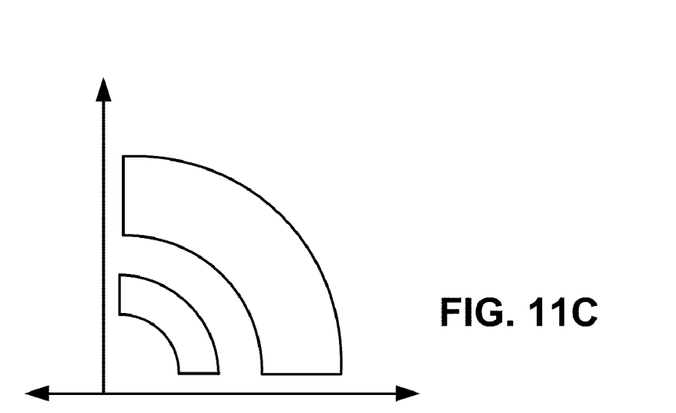

In some instances, the various spatial frequency zones used in encoding an image can have harmonic relations. FIGS. 10A and 10B show one such arrangement. FIG. 10A shows a first zone 130. FIG. 10B shows a second zone 132. Zone 132 comprises frequencies that are twice the frequencies of zone 130. Further harmonics may similarly be used.

Likewise, the use of different zones can be used for binary signal encoding. The zone 130 may represent a least significant bit, e.g., corresponding to "1" in decimal. Zone 132 may represent a next-least significant bit, e.g., corresponding to "2" in decimal. The addition of signal energy in both zones, as in FIG. 10C thus corresponds to "3" in decimal, etc.

In a variant embodiment, signal energy added to one chrominance channel is matched, in a complementary fashion, by subtraction of signal energy from the other chrominance channel. Such form of embedding is detailed in patent application Ser. No. 12/337,029. This approach allows use of lower frequency chrominance signals without visible degradation, and yields increased signal-to-noise ratio in the detector when processed according to the cited patent application's teachings. (In video according to this technique, the complementary subtraction operation can be applied to the same frame, or to a next frame in the video sequence.)

While it is possible to mark an entire image with a single key, more typically a sub-part of the image is so-marked. Commonly less than 20% of the image area is marked with any particular key. More typically (e.g., as shown in FIGS. 1 and 1A), a contiguous key region encompasses less than 10%, 5%, 3% or 1.5% of the entire image frame.

In practical application, artwork authoring tools such as Adobe Illustrator and the like will doubtless be employed to add keys to imagery. The hidden keys can be represented in visible fashion on the user's screen, such as by dashed outlines, distinctive cross-hatching, etc., so as to indicate the shapes to the user. These can be dragged and resized in known fashion, using tools such as have been popularized by Adobe. The authoring software can further include a print-preview feature that renders the imagery on the screen, including the keys in their hidden form—approximating any color space transformation and other distortions inherent in the printing workflow. (Different print-preview options may be provided, dependent on the type or fidelity of the print process, e.g., high resolution/fully saturated; low resolution/low saturation, etc.) The software may include a viewing mode in which two views (authoring and print-preview) are presented side-by-side.

Corresponding test application software can be provided for a smart phone used by the artist, which senses the added keys from imagery, and provides quantitative data back to the artist. As changes are made to the artwork, this software application can provide immediate feedback. Diagnostic windows can be displayed on the smart phone screen, or the authoring terminal (to which the phone may be linked wirelessly, or by USB or the like). These diagnostic windows can indicate key signal strengths, apparent sizes of key regions, confidence levels for key detection, etc.

Repeated reference was made to a smart phone, yet it will be understood that any device can serve as a detector of such signals. The earlier-cited documents detail some of the variety of devices, and diverse hardware configurations, that can be employed in such systems.

To provide a comprehensive yet concise disclosure, the documents referenced herein are incorporated-by-reference in their entireties, as if appended hereto as supplemental parts of this specification.

In view of the many embodiments to which principles of this technology can be applied, it should be recognized that the detailed embodiments are illustrative only and should not be taken as limiting the scope of my inventive work. Rather, I claim all such embodiments as fall within the scope and spirit of the following claims, and equivalents thereto. (These claims encompass only a subset of what I regard as inventive in this disclosure. No surrender of unclaimed subject matter is intended, as I reserve the right to submit additional claims in the future.)

I claim:

1. A method of marking color imagery employing a device having a processor, configured by software stored in a memory, to perform at least certain acts of the method, the method comprising the acts:

within imagery in a spatial or pixel domain, identifying at least one two-dimensional image sub-region;

the device processor encoding one or more chroma keys in said sub-region by altering a transform domain representation thereof, said altering comprising adding image signal energy in a first chrominance channel, said added image signal energy falling primarily within a segmented arc region in a transform domain space; and transmitting, storing or presenting the altered imagery, together with different auxiliary information;

wherein the encoded chroma key(s), in conjunction with the auxiliary information, serve to cooperatively define a response to said image sub-region when sensed by a mobile device including an image sensor.

2. The method of claim 1 in which the segmented arc region has a lower spatial frequency of at least 10 cycles per degree.

3. The method of claim 1 in which the segmented arc region has a lower spatial frequency of at least 20 cycles per degree.

4. The method of claim 1 in which the segmented arc region has a lower spatial frequency of at least 25 cycles per degree.

5. The method of claim 1 in which the segmented arc region has a lower spatial frequency of at least 30 cycles per degree.

6. The method of claim 1 wherein the two-dimensional sub-region comprises an area less than 20% of the color imagery.

7. The method of claim 1 wherein the two-dimensional sub-region comprises an area less than 10% of the color imagery.

8. The method of claim 1 wherein the two-dimensional sub-region comprises an area less than 5% of the color imagery.

9. The method of claim 1 wherein the two-dimensional sub-region comprises an area less than 3% of the color imagery.

10. The method of claim 1 wherein the two-dimensional sub-region comprises an area less than 1.5% of the color imagery.

11. The method of claim 1 wherein the auxiliary information comprises digital watermark information steganographically encoded in the imagery.

12. The method of claim 1 that further includes sensing said image sub-region by said mobile device, and identifying a response associated with said sub-region through use of the auxiliary information.

13. The method of claim 1 wherein said altering further comprises subtracting image signal energy in a second chrominance channel.

14. The method of claim 13 wherein the added and subtracted image signal energies fall predominantly within the segmented arc region.

15. The method of claim 13 wherein the added and subtracted image signal energies fall essentially within the segmented arc region.

16. The method of claim 13 wherein the added and subtracted image signal energies fall almost exclusively within the segmented arc region.

17. The method of claim 13 wherein the added and subtracted image signal energies fall exclusively within the segmented arc region.

18. A method employing a portable user device having a processor configured to perform at least certain acts of the method, and having a camera portion for capturing imagery, the method comprising the acts:

transforming imagery captured by the camera portion to yield corresponding data in a transform domain;

applying a template to detect therein a key in a segmented arc region of the transform domain;

receiving plural-bit auxiliary data;

through use of the plural-bit auxiliary data, determine a response corresponding to the detected key; and initiating said response.

19. A non-transitory computer readable storage medium containing software instructions that, when executed by a processor of a camera-equipped device, cause the device to perform acts including:

transforming imagery captured by the camera to yield corresponding data in a transform domain;

applying a template to detect therein a key in a segmented arc region of the transform domain;

receiving plural-bit auxiliary data;

through use of the plural-bit auxiliary data, determine a response corresponding to the detected key; and initiating said response.

* * * * *